Patented Mar. 17, 1942

2,276,693

UNITED STATES PATENT OFFICE 2,276,693

METHOD OF MAKING POROUS METAL-CONTAINING CATALYSTS

Sheldon B. Heath, Midland, Mich., assignor to The Dow Chemical Company, Midland, Mich., a corporation of Michigan No Drawing. Application August 2, 1940, Serial No. 350,151

3 Claims. (Cl. 252—256)

This invention concerns an improved method of making porous metal-containing catalysts which are suitable for use in the synthesis of ammonia.

The reaction between hydrogen and nitrogen to form ammonia at elevated temperatures and pressures takes place satisfactorily only in the presence of certain metal-containing catalysts, of which iron of a certain form, together with certain promoters which increase its catalytic activity, is most effective and most widely used. Iron of a form suitable for use in such catalysts is obtained by the oxidation of highly purified iron to ferroso-ferric oxide, $Fe_3O_4$, and reduction of the latter with hydrogen. A wide variety of promoters which may be used together with the iron are known. These generally are oxides of other metals, e. g. $K_2O$, $Na_2O$, $MgO$, $Al_2O_3$, $Cr_2O_3$, $MnO_2$, etc., or possibly during actual use, the metals themselves. The catalyst should be substantially free of halogens, sulphur and zinc, since they reduce its activity.

The utility and activity of the catalyst is dependent not only upon its composition, but also upon its physical form and the way in which it is prepared. It is preferably employed in the form of highly porous granules of good strength and capable of being handled and used without crumbling, since a powdered catalyst or one which crumbles to a powder during use offers too great a resistance to gas flow and is impractical.

The catalysts are usually prepared by burning highly purified iron in oxygen to form $Fe_3O_4$, admixing the latter with the catalyst promoters, and fusing the mixture. The fused mass is then granulated and reduced with hydrogen to obtain the final catalyst. This method of preparing the catalysts possesses several disadvantages. The preparation of ferroso-ferric oxide by burning iron in a current of oxygen requires the use of specially designed furnaces and seldom yields a product of uniform purity. Also, the ferroso-ferric oxide so-formed is active chemically when at the fusing temperature and cannot satisfactorily be melted in ordinary crucibles, since it tends to corrode the crucibles and thereby alter the composition of the fused mass. It is usually fused electrolytically in a bed of the same material. Furthermore, this usual method of preparing the catalyst does not permit control of the density or porosity of the product and seldom yields a uniform catalyst of optimum density and porosity.

An object of the present invention is to provide an improved method for the preparation of porous metal-containing catalysts, particularly iron-containing catalysts suitable for use in the synthesis of ammonia. Another object is to provide a method whereby the composition, porosity, and density of such catalyst may readily be controlled. A further object is to provide catalysts of increased activity and efficiency for the synthesis of ammonia. Other objects will be apparent from the following description of the invention.

I have found that the above objects and related advantages may be attained by mixing iron powder with the catalyst promoters, compacting the mixture into pieces of convenient size, e. g. compressing the mixture into briquettes, tablets, or pellets, etc., and subjecting the compacted material to the action of superheated steam, whereby the metal is oxidized and at the same time partially fused to form a strong rigid porous body which may be reduced to obtain porous briquettes, pellets, or tablets containing the metal in elemental state. The temperatures required for such oxidation by steam of iron in the presence of the promoters to obtain a solid porous body containing ferroso-ferric oxide are between 500° and 800° C., although higher temperatures, e. g. 1000° C. or higher, may be employed. They are considerably lower than the temperatures required for the fusion of ferroso-ferric oxide to form such rigid porous body. This mode of effecting the oxidation and partial fusion with steam is simple to carry out and requires no special equipment. It also permits ready control of the oxidation to obtain a uniform product of desired composition.

I have further found that in preparing a porous metal-containing catalyst according to the invention, the porosity of the final catalyst is largely dependent upon the particle sizes of the metal and the promotors used as starting materials and upon the pressure under which the mixture of these starting materials was compacted prior to the treatment with steam. In general, the employment of starting materials of extremely fine particle size and of high pressures in compacting the mixture favors the production of a porous catalyst containing extremely fine voids, whereas the use of coarser starting materials or of lower pressures in compacting the mixture results in the production of a catalyst containing somewhat larger voids.

I have also found, in preparing ammonia catalysts by the oxidation of mixtures of iron and promoters with superheated steam, that although it is necessary that at least 85 per cent of the iron be oxidized, and that at least 60 per cent of it be oxidized to ferroso-ferric oxide, $Fe_3O_4$, further oxidation, i. e. to form more than 1 mole of ferric oxide per mole of ferrous oxide, does not impair the activity or the utility of the catalyst product.

In preparing an iron-containing catalyst for use in the synthesis of ammonia, iron powder is intimately mixed in the usual proportions with any of the known promoters therefor and the mixture is pressed, e. g. under a pressure of from 25 to 1000 pounds per square inch or higher, into briquettes, tablets, or the like. The iron powder employed is usually of particle size capable of passing a 250 mesh screen, but a coarser or finer powder, e. g. between 100 and 350 mesh, may be employed. Highly purified iron, e. g. electrolytic iron, is preferably used, since the iron particles cement together best during treatment with superheated steam to yield a strong abrasion-resistant porous body when practically pure. Also the activity of the catalyst product is usually highest when the iron employed is of high purity. However, less pure forms of iron, e. g. wrought iron, decarbonized cast iron, sponge iron, and mild steel, have been used in the process to obtain highly active catalysts. The iron and also the other materials should, of course, be rendered substantially free of sulphur, halogen and zinc, since such impurities tend to poison, i. e. de-activate, the catalyst product.

The catalyst promoters, when used in solid form, are preferably of about the same fineness as, or finer than, the iron powder. A variety of promoters which may be used together with the iron are mentioned in U. S. Patents Nos. 1,148,570, 1,489,497, 1,771,130, and 1,844,963, which patents also indicate the proportions in which the promoters are to be used.

Prior to forming the briquettes or tablets, etc., the mixture of iron and one or more promoters may advantageously be treated with a small amount of water and a binding agent such as sugar, molasses, or gum arabic, etc., to aid in compacting the mixture.

The compacted mixture is preferably dried, and then contacted with steam superheated to any temperature above 500° C., preferably to a temperature between 600° and 800° C. The treatment with steam is continued until the iron is largely or entirely oxidized to form $Fe_3O_4$ or a mixture thereof with $Fe_2O_3$. The resulting porous briquettes or tablets may be broken, if necessary, into granules of convenient size, e. g. sufficient size to pass a 2 to 5 mesh screen. The granules may be treated as usual with hydrogen to reduce the iron oxide to metallic iron and thus form a porous granular material which is highly active as a catalyst for the synthesis of ammonia. Usually this reduction is carried out by placing the oxidized material in the ammonia generator. Upon operating the latter as usual, the iron oxide is first reduced by contact with the gaseous mixture of hydrogen and nitrogen, after which it promotes reaction between these gases to form ammonia.

The following examples illustrate several ways in which the principle of the invention has been applied, but are not to be construed as limiting the same.

*Example 1*

60 grams of finely divided annealed electrolytic iron powder (smaller than 100 mesh) was intimately mixed with 4.43 grams of powdered magnesium oxide, 1.13 grams of potassium carbonate, and 0.75 gram of 200-mesh silicon dioxide in a ball mill. The mixture was separated into three 20-gram portions, each of which was moistened with 1.0 gram of water and molded into a disc-shaped briquette, 2 inches in diameter and ¼ inch thick, under a pressure of 50 lbs./sq. in. The briquettes were then placed in a tubular reaction chamber through which superheated steam at a temperature of about 760° C. was passed for 14 hours. The oxidized briquettes were allowed to cool and were crushed to 4-8 mesh. The crushed material was found by analysis to contain 3.8 per cent by weight of magnesium oxide, 0.73 per cent by weight of potassium oxide, and 0.88 per cent by weight of silicon dioxide. It had an apparent density of about 111 lbs./cu. ft. and substantially all of the iron present was in the form of ferroso-ferric oxide. This catalyst was compared with a commercially available catalyst of substantially the same chemical composition in a small ammonia converter. In separate experiments, the converter was operated at temperatures of 450° C., 465° C., and 480° C. under 4850 lbs./sq. in. pressure, and employing gas velocities which were normal, half-normal, and twice-normal, respectively, for the converter under use. The inlet gas was a 1:3 nitrogen-hydrogen mixture containing 3.5 per cent by volume of ammonia. After the usual incubation period (i. e. the period for reduction of the oxide catalyst by the nitrogen-hydrogen mixture) and when equilibrium conditions were established in the converter, the exit gases were analyzed for ammonia content. The data are tabulated in Table I.

*Table I*

| Run No. | Temp., °C. | Gas velocity cu. ft./min. | $NH_3$ in exit gas, per cent by volume | |
|---|---|---|---|---|
| | | | Catalyst prepared as described in Example 1 | Commercially available catalyst |
| 1 | 450 | 0.27 | 10.6 | 8.2 |
| 2 | 450 | 0.13 | 10.6 | 10.2 |
| 3 | 450 | 0.54 | 8.1 | 6.3 |
| 4 | 465 | 0.27 | 10.8 | 8.6 |
| 5 | 465 | 0.13 | 12.8 | 9.8 |
| 6 | 465 | 0.54 | 9.0 | 6.6 |
| 7 | 480 | 0.27 | 12.3 | 8.7 |
| 8 | 480 | 0.13 | 11.0 | 9.7 |
| 9 | 480 | 0.54 | 8.6 | 7.1 |

*Example 2*

A mixture of 60 grams of finely divided annealed electrolytic iron, 1.6 grams of powdered aluminum oxide, 0.75 gram of potassium carbonate, and 0.2 gram of silicon dioxide was moistened with water and molded into briquettes as in Example 1. The briquettes were then treated with superheated steam at a temperature of about 790° C. for 15 hours, after which they were cooled and crushed to 4-8 mesh. This catalyst had an apparent density of about 120 lbs./cu. ft. and contained approximately 90 per cent by weight of ferroso-ferric oxide, the remainder of the iron being present as ferric oxide. When tested for catalytic activity as described in Example 1, the exit gases from operation at 450° C. at 0.27 cu. ft./min. gas velocity contained 10.8 per cent by volume of ammonia.

*Example 3*

A mixture comprising 18.1 kgs. of annealed electrolytic iron powder, 1.6 kgs. of technical magnesium oxide (90% MgO), 121 grams of potassium carbonate sesquihydrate, and 121 grams of diatomaceous earth was mixed in a ball mill for 15 minutes. A solution of 170 grams of sugar in 500 grams of water and 925 milliliters of 30° Bé. potassium silicate solution $$(K_2O:SiO_2 = 1:3.9)$$

was added to the mixture in the mill and mixing was continued for ten minutes. The damp mix was divided into 180 gram portions and each portion was molded into a briquette approximately 3.0 inches in diameter and 0.75 inch thick employing a pressure of about 50–75 lbs./sq. in. The briquettes were allowed to dry and were then treated with superheated steam at a temperature of 600°–800° C. for 5 hours, after which time they were cooled out of contact with air. After crushing to approximately ⅜ inch size, the catalyst was suitable to be placed in active service in an ammonia converter.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of making a solid porous catalyst which is capable of promoting reaction between hydrogen and nitrogen to form ammonia, the steps which consist in mixing finely divided metallic iron with a suitable promoter therefor, compacting the mixture, and treating the compacted mixture with superheated steam at a reaction temperature above 500° C. to oxidize at least 85 per cent of the iron and form a solid porous composition comprising ferroso-ferric oxide.

2. In a method of making a solid porous catalyst which is capable of promoting the reaction between hydrogen and nitrogen to form ammonia, the steps which consist in mixing finely divided metallic iron with a suitable promoter, pressing the mixture into compact pieces, treating the pieces with superheated steam at a reaction temperature between about 600° and about 800° C. until at least 85 per cent of the iron has been oxidized and at least 60 per cent of the iron has been oxidized to ferroso-ferric oxide.

3. In a method of making a solid porous catalyst which is capable of promoting the reaction between hydrogen and nitrogen to form ammonia, the steps which consist in mixing finely divided metallic iron with a suitable promoter and a binding agent for the mixture, pressing the mixture into compact pieces, treating the pieces with superheated steam at a reaction temperature between about 600° and about 800° C. to oxidize the iron substantially to ferroso-ferric oxide and at the same time cause partial fusion of the mixture and resultant cementing together of the particles in the pieces, and thereafter treating the pieces with hydrogen to reduce the oxidized iron to metallic iron.

SHELDON B. HEATH.